United States Patent
Paleczek

(10) Patent No.: US 12,358,336 B2
(45) Date of Patent: Jul. 15, 2025

(54) DAMPING ARRANGEMENT FOR AN AXLE OF A MOTOR VEHICLE AND MOTOR VEHICLE

(71) Applicant: Dr. Ing. h.c. F. Porsche Aktiengesellschaft, Stuttgart (DE)

(72) Inventor: Josef Paleczek, Tiefenbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/673,599

(22) Filed: May 24, 2024

(65) Prior Publication Data

US 2025/0058597 A1    Feb. 20, 2025

(30) Foreign Application Priority Data

Aug. 18, 2023   (DE) .......................... 102023122143.4

(51) Int. Cl.
*B60G 17/08*    (2006.01)

(52) U.S. Cl.
CPC .......... *B60G 17/08* (2013.01); *B60G 2200/34* (2013.01); *B60G 2202/24* (2013.01); *B60G 2202/416* (2013.01); *B60G 2204/418* (2013.01); *B60G 2600/182* (2013.01)

(58) Field of Classification Search
CPC .............. B60G 17/08; B60G 2200/34; B60G 2202/24; B60G 2202/416; B60G 2204/418; B60G 2600/182
See application file for complete search history.

(56) References Cited

U.S. PATENT DOCUMENTS

| | | | |
|---|---|---|---|
| 11,554,625 B2 * | 1/2023 | Kemnitz | B60G 17/044 |
| 2015/0360532 A1* | 12/2015 | Kim | B60G 17/021 |
| | | | 280/5.5 |

FOREIGN PATENT DOCUMENTS

| | | |
|---|---|---|
| DE | 4317467 A1 | 12/1994 |
| DE | 102018209467 A1 | 12/2019 |
| DE | 102018118785 A1 | 2/2020 |

(Continued)

OTHER PUBLICATIONS

DE102018122226A1 Machine English Translation (Year: 2018).*

(Continued)

*Primary Examiner* — Jason D Shanske
*Assistant Examiner* — Matthew James O'Neill
(74) *Attorney, Agent, or Firm* — Buchanan Ingersoll & Rooney PC

(57) ABSTRACT

A damping arrangement of an active chassis for an axle of a motor vehicle. A damping system cooperates with each wheel of the axle, wherein each of the damping systems includes a damper, a hydraulic pump, and an electric motor. A hydraulic unit includes a hydraulic reservoir and valves, wherein the hydraulic pump and the hydraulic unit of the respective damping system cooperate with hydraulic chambers of the hydraulic cylinder of the respective damping system, such that, depending on the conveying direction of the hydraulic pump of the hydraulic unit, a movement of the piston in a first actuation direction or in a second actuation direction can be provided. The hydraulic pumps and the electric motors of both damping systems are combined to form a motor-pump unit. The motor-pump unit is fastened on both sides thereof to an axle carrier of the axle via two bearings.

10 Claims, 8 Drawing Sheets

(56) References Cited

FOREIGN PATENT DOCUMENTS

| | | | |
|---|---|---|---|
| DE | 102018122226 A1 * | 3/2020 | ............. B60K 25/00 |
| DE | 102019118384 A1 | 1/2021 | |
| DE | 102017117658 B4 | 6/2021 | |
| DE | 102019115492 B4 | 8/2022 | |
| WO | 2017000990 A1 | 1/2017 | |

OTHER PUBLICATIONS

German Examination Report issued Jul. 11, 2024, by the German Patent and Trademark Office in corresponding German Application No. 10 2023 122 143.4 with an English translation. (6 pages).

* cited by examiner

DAMPING ARRANGEMENT FOR AN AXLE OF A MOTOR VEHICLE AND MOTOR VEHICLE

CROSS-REFERENCE TO RELATED APPLICATION

This application claims priority to German Patent Application No. 10 2023 122 143.4, filed Aug. 18, 2023, the content of such application being incorporated by reference herein in its entirety.

FIELD OF THE INVENTION

The invention relates to a damping arrangement of an active chassis of a motor vehicle for an axle of the motor vehicle, and to a motor vehicle.

BACKGROUND OF THE INVENTION

DE 10 2017 117 658 B4 and DE 10 2019 115 492 B4, which are both incorporated by reference herein, each disclose a damping system for a wheel of a motor vehicle, having a damper, a hydraulic pump driven by an electric motor, a hydraulic reservoir, and multiple valves. The damper is formed from a double-acting hydraulic cylinder and a piston movable in a reciprocating manner within said cylinder. The hydraulic pump is coupled to hydraulic chambers of the hydraulic piston via hydraulic lines, wherein a movement of the piston in a first actuation direction or in a second actuation direction can be provided depending on the conveying direction of the hydraulic pump.

An axle of a motor vehicle comprises two wheels that engage via respective wheel suspensions on an axle carrier, which can be designed as a subframe or auxiliary frame. A subframe engages decoupled on a body of the motor vehicle via bearings. An auxiliary frame is not decoupled from a body of the motor vehicle. An axle of an active chassis is provided with a damping system for each wheel. The two damping systems for the two wheels of an axle are part of a damping arrangement of the respective axle of the motor vehicle.

It is known from DE 10 2019 118 384 A1, which is incorporated by reference herein, that the electric motor and the hydraulic pump of a damping system of a respective wheel of an axle of an active chassis are combined to form a motor-pump group. A common electronic unit cooperates with both motor-pump groups of a respective axle. The electronic unit is installed between the two motor-pump groups. The two motor-pump groups form a motor-pump unit, which is installed via receptacles on the motor vehicle. The electronic unit is part of the motor-pump unit.

WO 2017/000 990 A1, which is incorporated by reference herein, discloses an electric coolant pump of a motor vehicle having a pump housing, wherein the pump housing is fixed to a vehicle structure via a fastening structure. The fastening structure is arranged on the pump side exclusively on a flow housing part of the pump housing.

In practice, it has been shown that the motor-pump unit of a damping arrangement of an axle of an active chassis vibrates strongly while traveling, in particular due to excitation from the roadway. This may be disadvantageous.

SUMMARY OF THE INVENTION

Described herein is a damping arrangement of an axle of an active chassis of a motor vehicle which limits the vibration amplitudes of the motor-pump unit of the damping arrangement. Vibrational excitations or pulsations caused by the motor-pump unit itself must also be limited to the body via the axle carrier.

Described herein is a damping arrangement of an axle of an active chassis of a motor vehicle, in which the motor-pump unit vibrates less when traveling when it is simply connected to an axle carrier of the motor vehicle. It is further intended to provide a motor vehicle having such a damping arrangement.

In the damping arrangement according to aspects of the invention, the motor-pump unit is fastened to an axial carrier of the axle of the motor vehicle on both sides thereof via at least two bearings, each of which is received in a common bearing carrier.

A first bearing carrier is integrated into a first housing cover of a housing of the motor pump unit, while a second bearing carrier is connected to a second housing cover of the housing of the motor pump unit via a bearing tube and a tie rod.

The motor-pump unit of the damping arrangement can be simply connected to an axle carrier of the motor vehicle. Furthermore, the motor-pump unit tends to vibrate less when traveling and transmits natural vibrations in a damped manner.

Preferably, the respective bearing carrier is designed in a goggle-like manner such that the same comprises a monolithic base body with two recesses positioned next to each other for receiving a respective elastic bearing. This design of the bearing carrier allows for easy connection of the motor-pump unit to the axle carrier. Furthermore, the bearings reduce the tendency of the motor pump unit to vibrate while the motor vehicle is traveling.

Preferably, the base body of the first bearing carrier is integrated into the first housing lid of the housing of the motor pump unit, while the base body of the second bearing carrier is connected to the second housing cover of the housing via the bearing under pressure, wherein the base body of the second housing carrier and the second housing cover are arranged opposite one another on the bearing tube and connected to one another via the tie rod under tensile load of the same. This design is particularly preferable in order to reduce the tendency of the motor-pump unit to vibrate when it is simply connected to the axle carrier.

Preferably, the respective bearing has a central recess through which a bushing and a screw can extend to fasten the respective bearing to the axle carrier, wherein the respective bushing receives a clip to guide cables and/or hoses on the respective bearing. This is preferred in order to fasten cables and/or hoses to the motor-pump unit in a defined manner and to decouple them from vibrations and thus guide the damping arrangement.

Preferably, the bearing tube and the tie rod and/or the motor-pump unit extend in the construction space for the stabilizer instead of a stabilizer and are preferably fastened to connection areas of the axle carrier for the stabilizer via the respective bearing carrier. This advantageously makes it possible to integrate the motor-pump unit together with the bearing tube and tie rod into a motor vehicle with a low construction space requirement.

BRIEF DESCRIPTION OF THE DRAWINGS

Preferred further developments of the invention are disclosed in the dependent claims and the description that follows. Embodiment examples of the invention will be explained in greater detail with reference to the drawings, but without being restricted thereto. In the drawings:

DETAILED DESCRIPTION OF THE INVENTION

Figure 1:
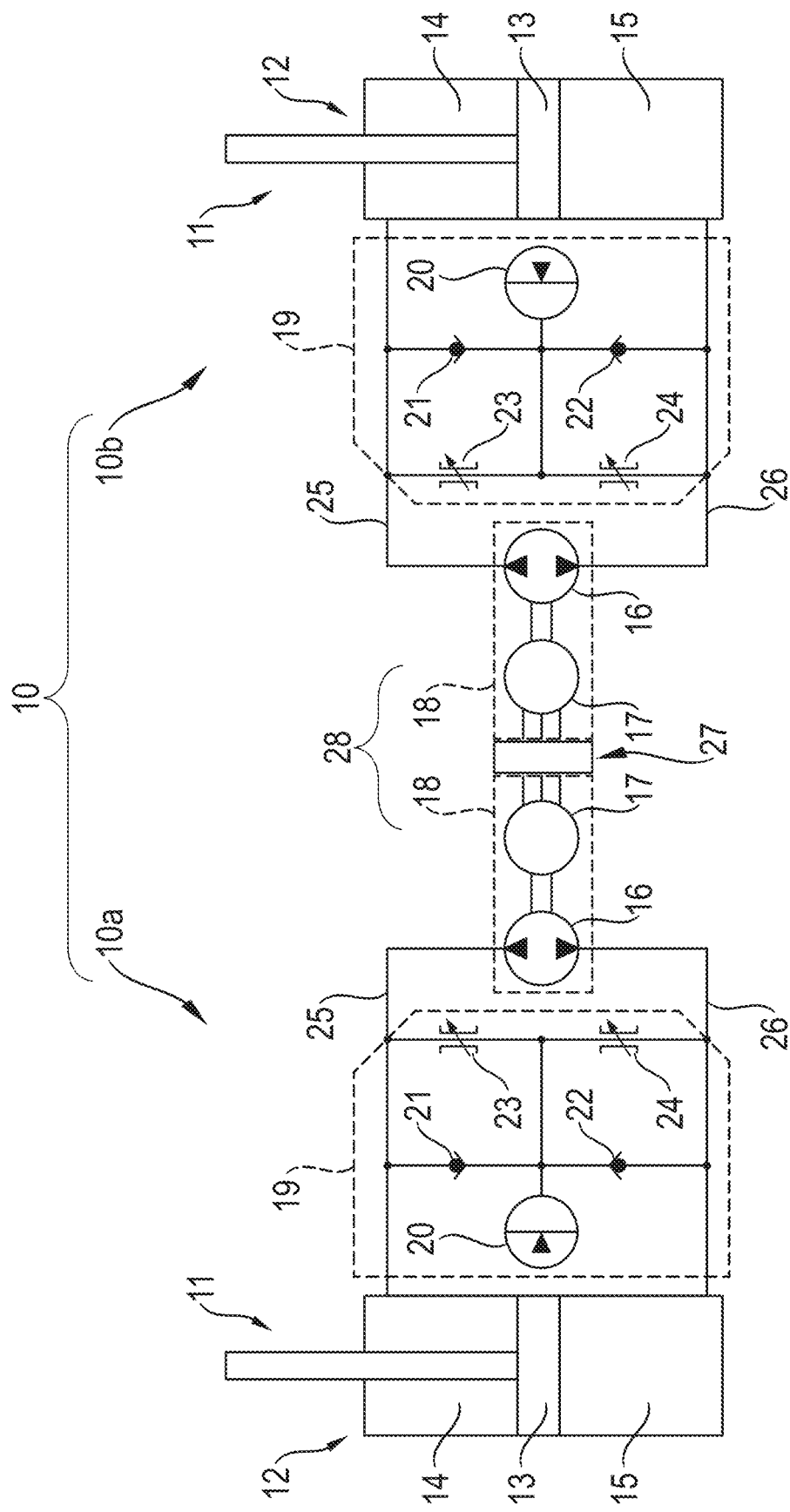
FIG. 1 shows a schematic representation of hydraulic assemblies of a damping arrangement according to aspects of the invention for the wheels of an axle of an active chassis according to aspects of the invention.

A motor vehicle, such as a passenger vehicle, has multiple axles. Each axle has two wheels, which typically engage with an axle carrier, in particular a subframe, of the respective axle via corresponding wheel suspensions. The subframe of the respective axle engages decoupled on a body of the motor vehicle via bearings. The wheel suspensions may also engage on an axle carrier designed as an auxiliary frame that does not engage decoupled on the body of the motor vehicle. Subframes can preferably be used in the area of a rear axle and auxiliary frame, preferably in the area of a front axle. If the respective axle of the motor vehicle is the axle of an active chassis of the motor vehicle, a damping arrangement 10 is present for the two wheels of the axle of the active chassis, wherein FIG. 1 shows a preferred embodiment of a damping arrangement 10 for the two wheels of an axle of an active chassis of a motor vehicle.

The damping arrangement 10 of an axle of the active chassis has a damping system 10a, 10b for each wheel of the axle. Each of the damping systems 10a, 10b comprises a damper 11 which is couplable to a wheel suspension system (not shown) for the respective wheel (not shown). Each damper 11 is formed by a double-acting hydraulic cylinder 12 and a piston 13, wherein the piston 13 is movable back and forth in the hydraulic cylinder 12 (up and down in FIG. 1). The hydraulic cylinder 12 designed as a double-acting hydraulic cylinder of each of the damping systems 10a, 10b comprises a hydraulic chamber 14, 15 on each side of the piston 13. Dependent upon which of the two hydraulic chambers 14, 15 is being supplied with hydraulic oil and from which of the two hydraulic chambers 15, 14 hydraulic oil is being discharged, the piston 13 can be displaced in either a first actuation direction or in an opposing second actuation direction. The first actuation direction of the piston 13 involves an actuation in the pulling direction and the second actuation direction of the piston 13 is an actuation in the pushing direction.

Each damping system 10a, 10b further comprises a hydraulic pump 16 that is drivable by a respective electric motor 17. The hydraulic pump 16 and the electric motor 17 of each damping system 10a, 10b form a respective motor-pump group 18. The hydraulic pump 16 is a reversible pump that can be driven by the respective electric motor 17 in different directions of rotation in order to provide different conveying directions.

Each damping system 10a, 10b of FIG. 1 further comprises a hydraulic unit 19 having a hydraulic reservoir 20 as well as valves 21, 22, 23, 24. The valves 21, 22 are check valves, and the valves 23, 24 are damping valves. The hydraulic reservoir 20 of each of the damping systems 10a, 10b engages in each case between the check valves 21, 22 and between the damping valves 23, 24 on hydraulic lines of the hydraulic unit 19 which are coupled to the hydraulic chambers 14, 15.

Dependent upon the conveying direction of the hydraulic pump 16 and preferably also dependent upon the position of the valves 21, 22, 23, 24 of each damping system, in order to displace the piston 13 in the first movement direction, that is the pulling direction, oil is supplied to the hydraulic chamber 14 and oil is removed from the hydraulic chamber 15, or, in order to provide a second movement direction of the piston 13 in the second movement direction, that is the pushing direction, oil is supplied to the hydraulic chamber 15 and oil is removed from the hydraulic chamber 14.

The hydraulic pump 16 of the motor-pump group 18 of the respective damping system 10a, 10b is connected to the hydraulic unit 19, comprising the hydraulic reservoir 20 and the valves 21, 22, 23, 24, of the respective damping system 10a, 10b which unit is preferably installed as a unit on the damper 12 and/or on the hydraulic cylinder 13, via hydraulic lines 25, 26.

A common control device 27 cooperates with the motor-pump groups 18 of the two damping systems 10a, 10b of the damping arrangement 10 of the axle of the active chassis. The electric motors 17 of the two motor-pump groups 18 are drivable by the common control device 27.

The two motor-pump groups 18 of the two damping systems 10a, 10b and the common control device 27 form a motor-pump unit 28 of the damping arrangement 10.

The present invention relates to such details of the damping arrangement 10, which can be used to ensure that the motor-pump unit 28 of the damping arrangement 10 of the axle of the active chassis of the motor vehicle vibrates less strongly when the motor-pump unit 28 is simply connected to the axle carrier of the motor vehicle when the motor vehicle travels, and/or that vibrational excitations or pulsations caused by the motor-pump unit 28 itself are only transmitted to the body via the axle carrier in a damped manner.

The motor-pump unit 28, which comprises the two motor-pump groups 18 and the common control device 27, is fastened on both sides thereof to the axle carrier of the respective axle via preferably two bearings 29 in each case, the bearings 29 arranged on both sides of the motor-pump unit 28 being received or fastened in each case in a common bearing carrier 30.

A first bearing carrier 30 is present on a first side of the motor-pump unit 28, which receives the respective bearings 29, wherein said first bearing carrier 30 is integrated into a first housing cover 31 of a housing 32 of the motor-pump unit 28. This first bearing carrier 30 is shown in FIG. 2, 3 on the right side of the motor-pump unit 28, wherein this first bearing carrier 30 is integrated into the housing cover 31 of the housing 32 of the motor-pump unit 28, which closes the cavity of the housing 32 on the front side, in which the right motor-pump group 18 shown in FIG. 2, 3 is received.

Figure 6:
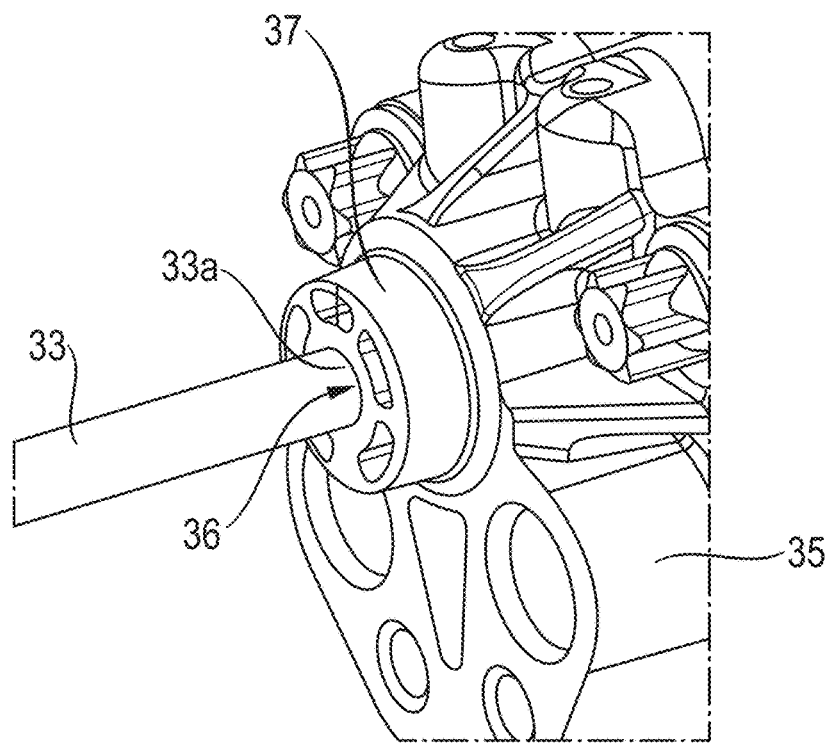
FIG. 6 depicts the detail of FIG. 5 together with a tie rod.
Figure 7:
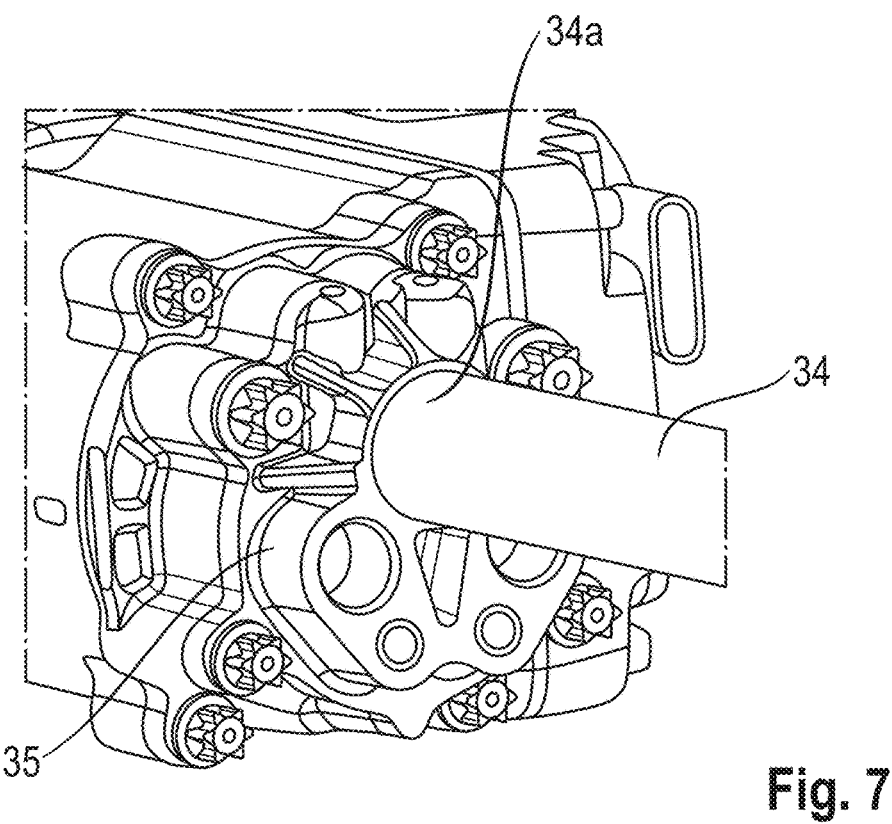
FIG. 7 depicts the detail of FIG. 6 together with the bearing tube.
Figure 8:
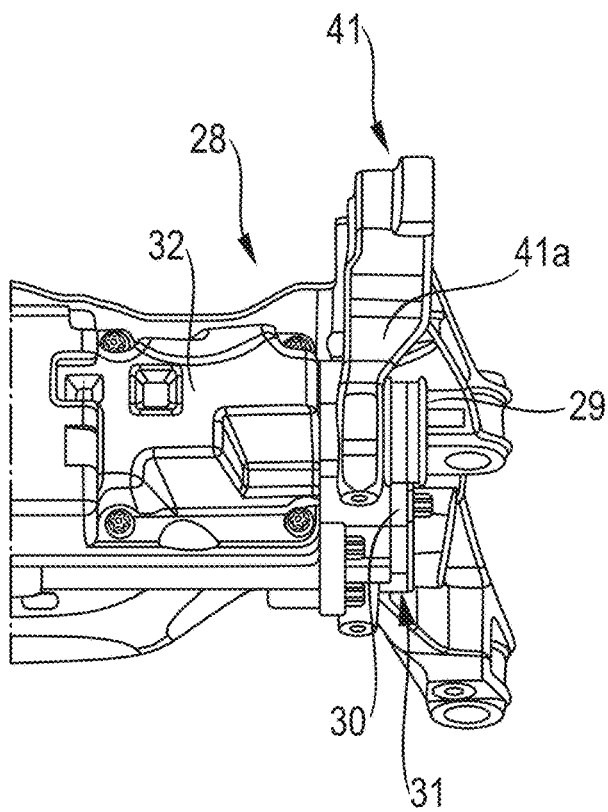
FIG. 8 depicts an excerpt of a motor vehicle in the area of a first end of an axle carrier and a first end of the damping arrangement mounted on the axle carrier.
Figure 9:
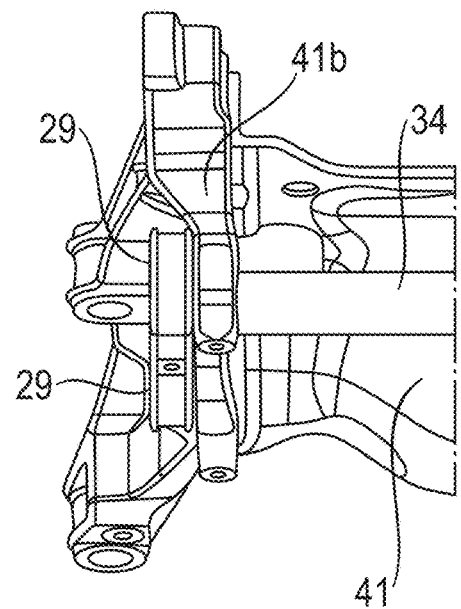
FIG. 9 depicts an excerpt of a motor vehicle in the area of a second end of the axle carrier and a second end of the damping arrangement mounted on the axle carrier.
Figure 10:
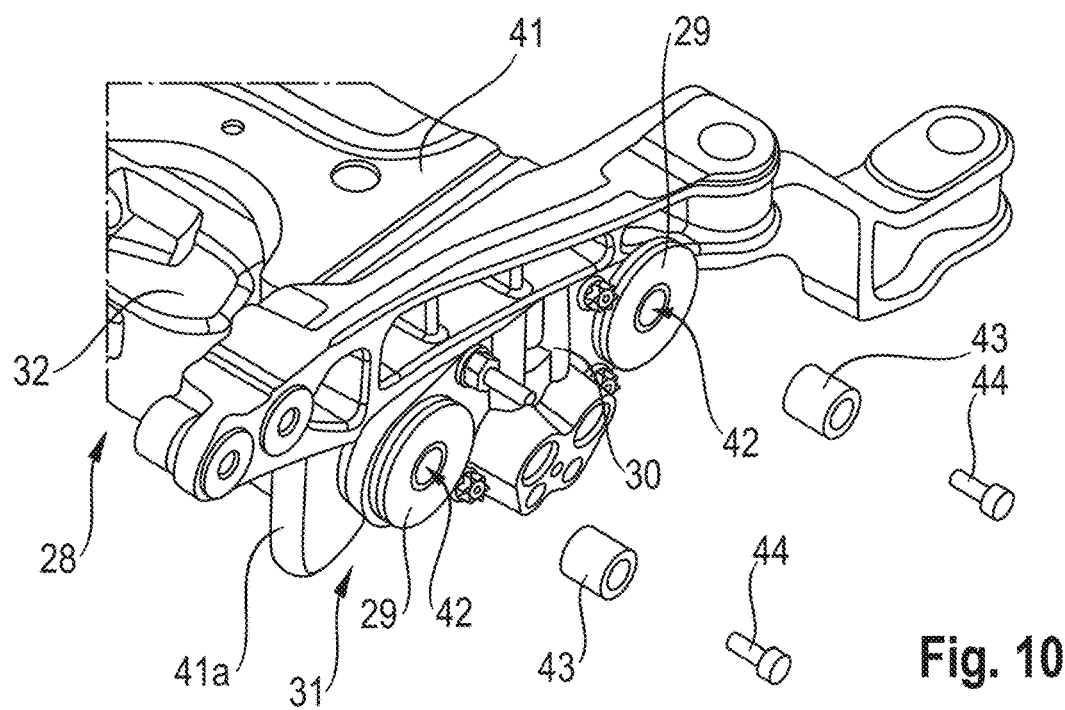
FIG. 10 depicts the excerpt of FIG. 8 in a perspective view in a partial exploded view.
Figure 11:
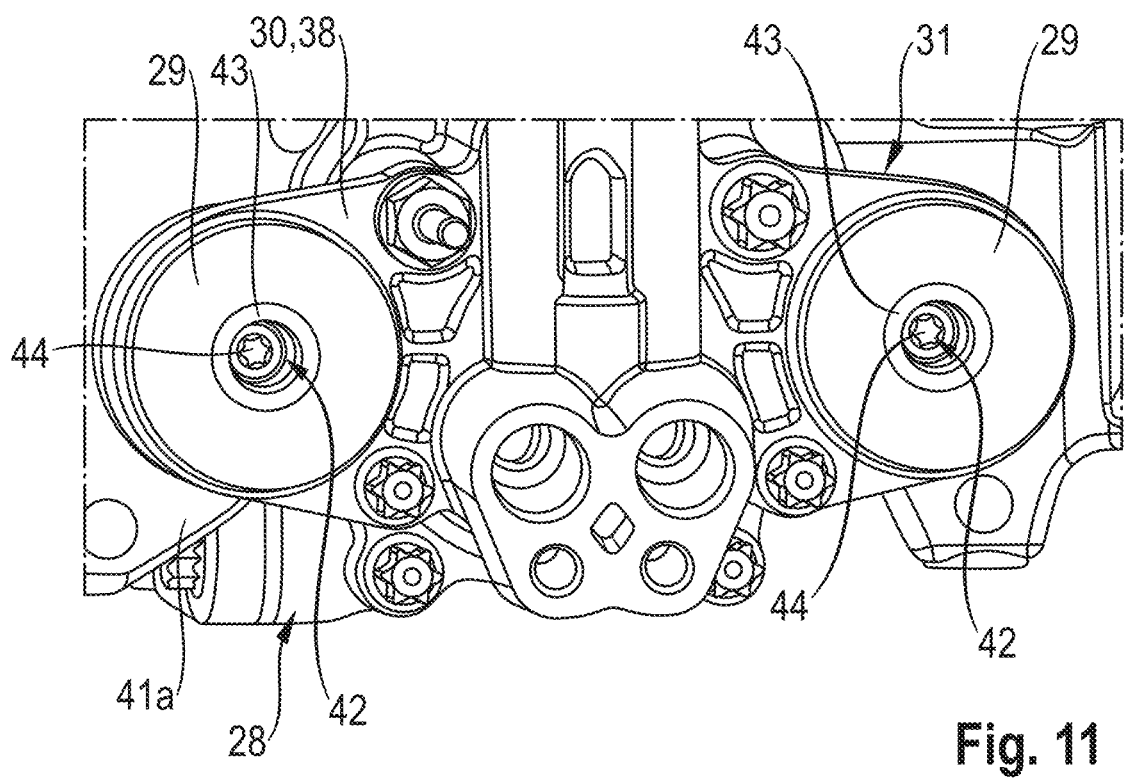
FIG. 11 depicts the excerpt of FIGS. 8, 10 in a further view.
Figure 13:
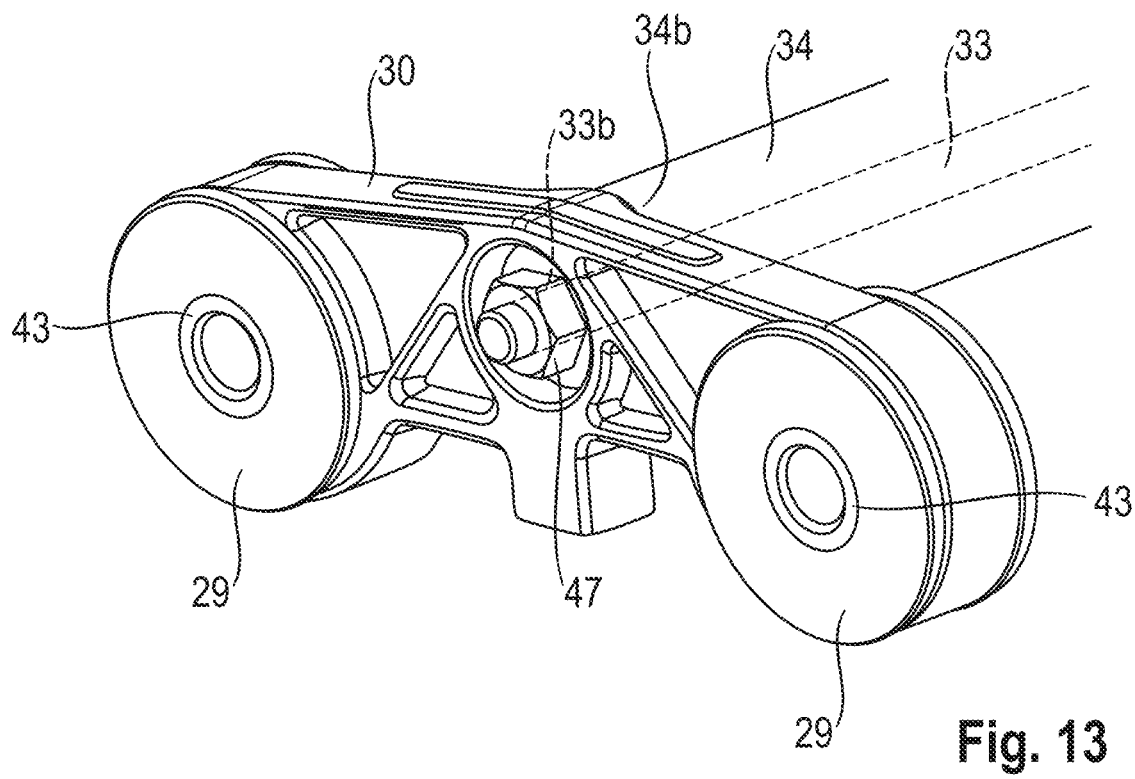
FIG. 13 depicts a further excerpt of the damping arrangement according to aspects of the invention in the area of the second end in a first perspective view.
Figure 14:
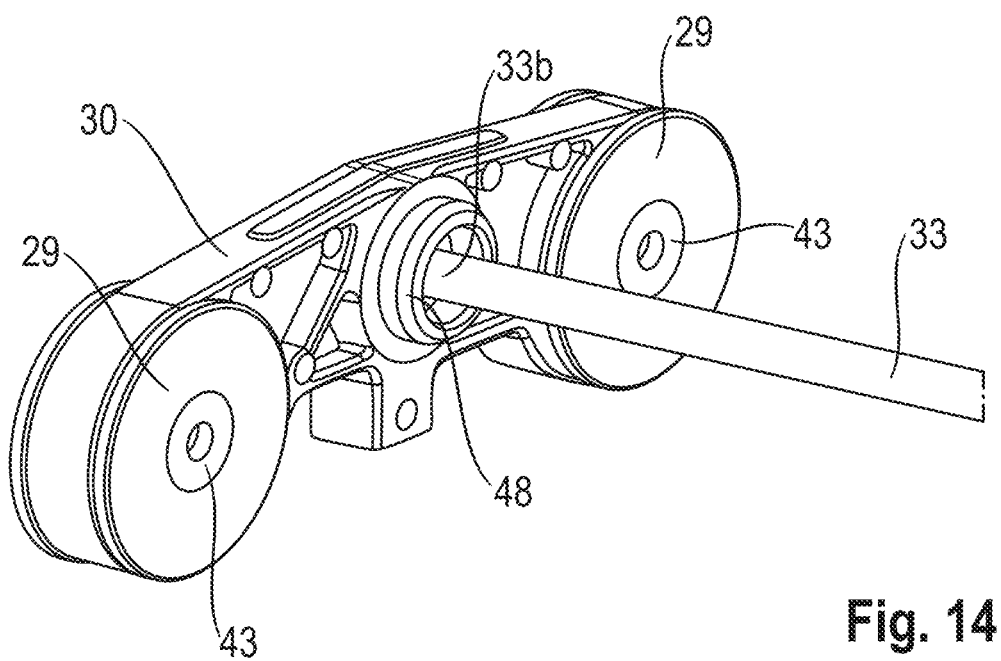
FIG. 14 depicts the excerpt of FIG. 13 in a second perspective view.

A second bearing carrier 30, which in turn preferably receives two bearings 29, is connected to the second housing cover 35 of the housing 32 of the motor-pump unit 28 (see FIG. 6, 7) via a tie rod 33 (see FIG. 6, 13) and a coaxially arranged bearing tube (see FIG. 13, 14). The tie rod 33 connects the second bearing carrier 30 to the second housing cover 35 of the housing 32 of the motor-pump unit 28 on or under a tensile load of the tie rod 33. The bearing tube 34, on the other hand, is correspondingly pressurized. A moment around a bearing tube axle and a tie rod axis are transmitted via friction. The transmissible friction torques may be increased via knurling or comparable geometries of the front sides of the bearing tube 34. The second housing cover 35 closes the front side of the cavity of the housing 32 in which the left motor-pump group 18 shown in FIG. 2, 3 is received.

The tie rod 33 has an external thread at a first end 33a, with which it is screwed into a recess 36 having an internal thread on the second housing cover 35. The second bearing carrier 30 engages on the opposite second end 33b of the tie rod 33 such that the second bearing carrier 30 is pushed onto the second end 33b of the tie rod 33 and is fixed in its pushed-on position via a nut 47 on the second end 33b of the tie rod 33. The nut 47 comprises an internal thread, which cooperates with a corresponding external thread at the second end 33b of the tie rod 33.

Figure 2:
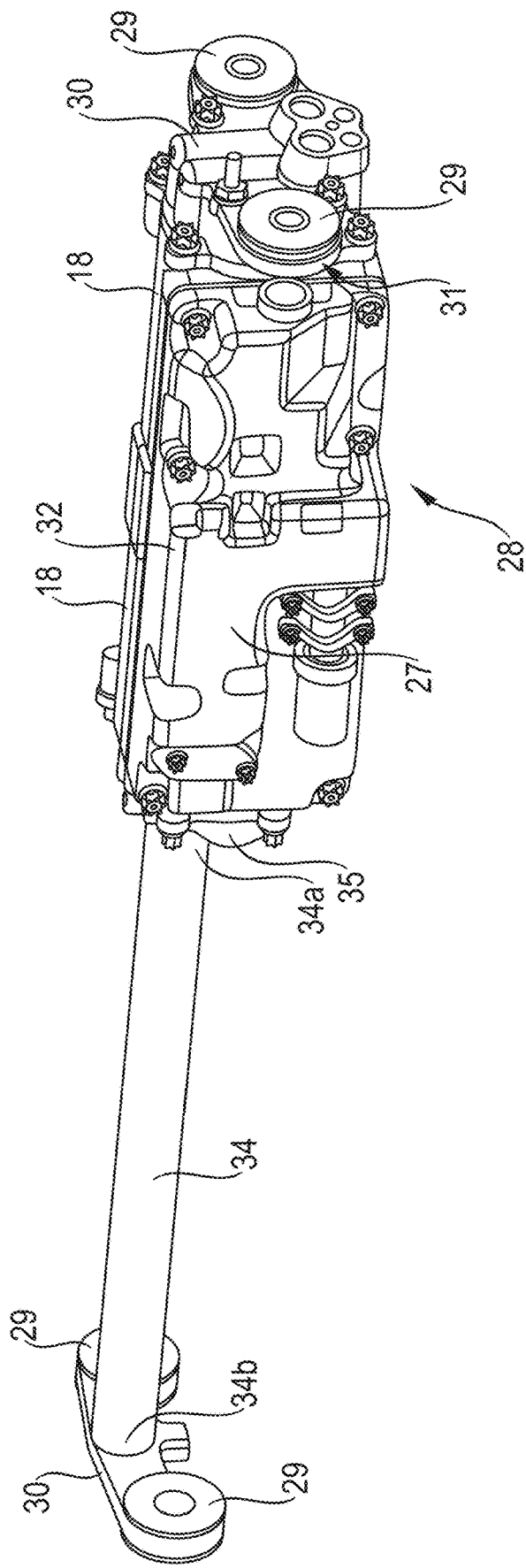
FIG. 2 depicts an excerpt from a damping arrangement according to aspects of the invention in the area of a motor-pump unit, a bearing tube, and bearings in a first perspective view.
Figure 3:
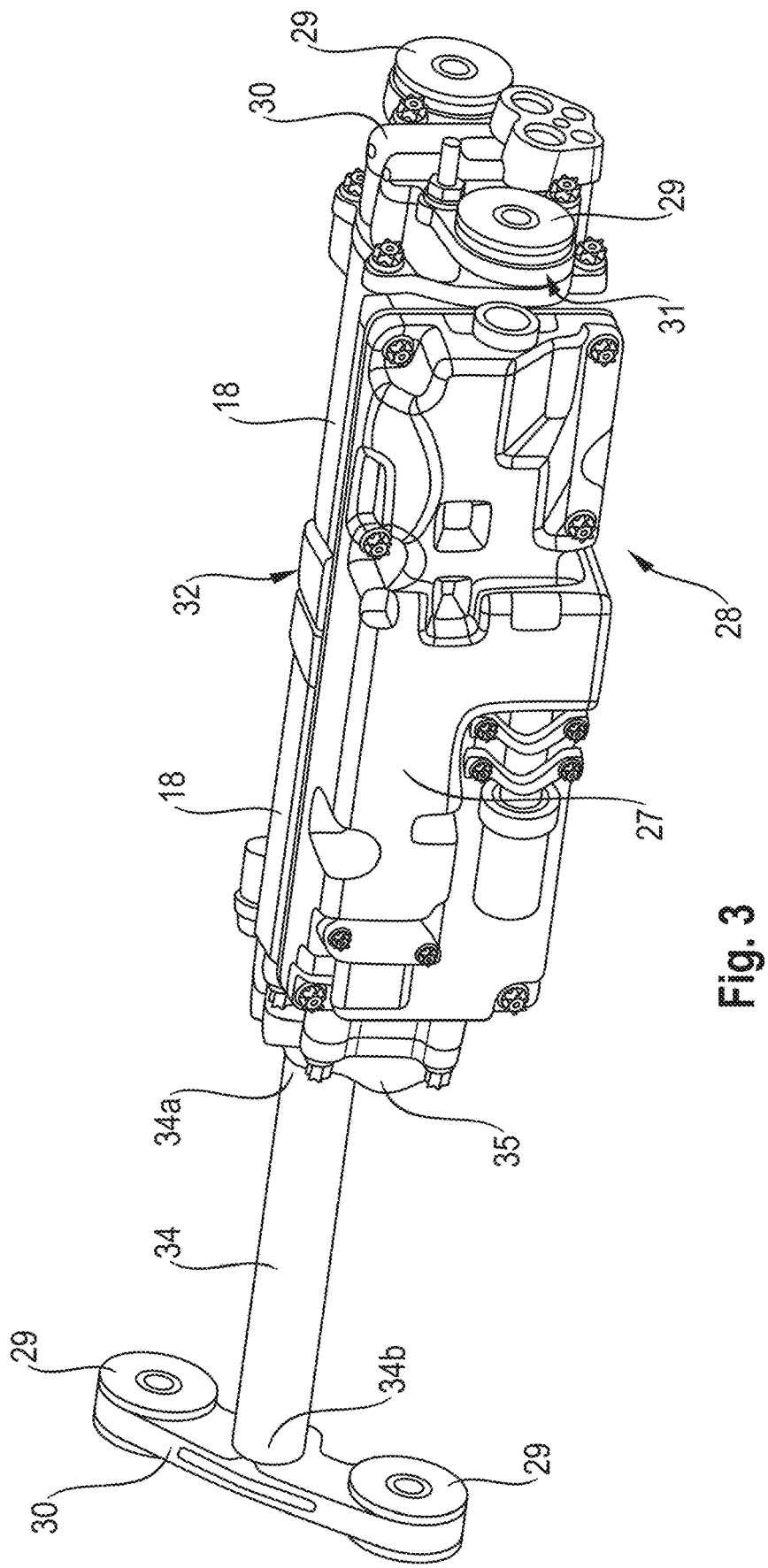
FIG. 3 depicts the excerpt of FIG. 2 in a second perspective view.
Figure 4:
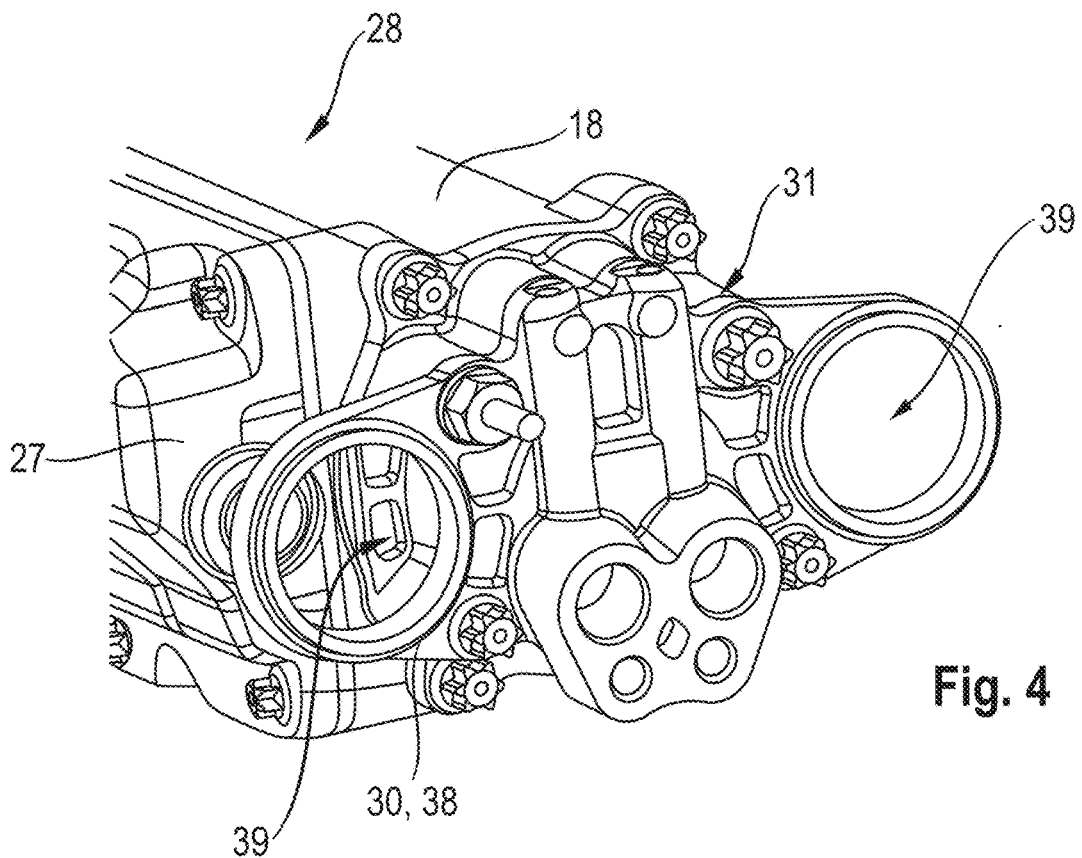
FIG. 4 depicts a detail of the excerpt of FIGS. 2 and 3 in the area of a first end of the motor-pump unit.
Figure 5:
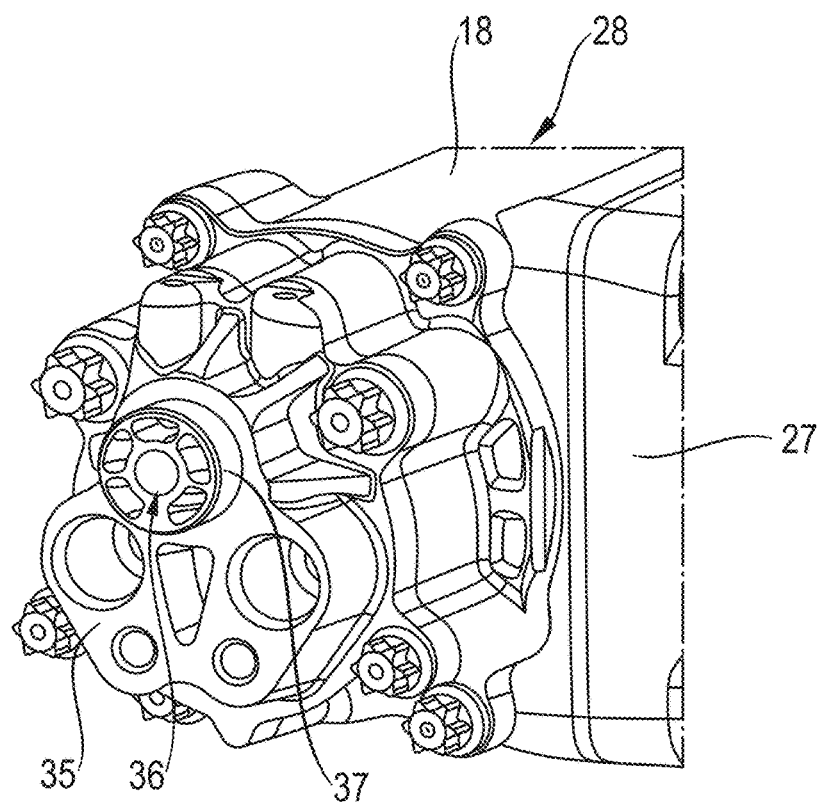
FIG. 5 depicts a further detail of the excerpt of FIGS. 2 and 3 in the area of a second end of the motor-pump unit.

As can been seen from FIGS. 2 and 3, the second bearing carrier 30 may be mounted on the tie rod 33 in virtually any relative rotational position. As a result, it is possible to fasten the motor-pump unit 28 to the axle carrier of the motor vehicle while compensating for manufacturing-related tolerances. In addition, it is possible to react flexibly to different installation spaces on different axles by rotating the second bearing carrier 30 around the bearing pipe or tie rod axis and thus to use the damping arrangement flexibly on different axles.

Thus, while the first bearing carrier 30, which preferably receives two bearings 29, is integrated into a first housing cover 31 of the housing 32 of the motor-pump unit 28, the second bearing carrier 30, which also preferably receives two bearings 29, is mounted on the second housing cover 35 of the housing 32 of the motor-pump unit 28 via the tie rod 33 and the bearing tube 34.

As already stated above, the tie rod 33 extends within the bearing tube 34, wherein the bearing tube 34 is attached to a projection 37 on the second housing cover 35 with a first end 34a and to a projection 48 of the second bearing carrier 30 with an opposite end 34b.

The respective bearing carrier 30, which receives the two bearings 29, has a goggle-like design. The same has a monolithic base body 38, having two recesses 39 arranged next to each other, wherein one of the elastic bearings 29 is inserted into each of the two recesses 39.

The monolithic base body 38 of the first bearing carrier 30 is integrated into the first housing cover 31 of the housing 32 of the motor-pump unit 28. The monolithic base body 38 of the second bearing carrier 30 is connected to the second end 33b of the tie rod 33 and to the bearing tube 34.

FIGS. 8, 9, 10, 11, and 12 show excerpts of a structural unit comprising the motor-pump unit 28, the bearing tube 34, the two bearing carriers 30, and the four bearings 29 together with excerpts of an axle carrier 41.

According to FIGS. 8, 10, 11, and 12, the motor-pump unit 28 is mounted to a first section 41a of the axle carrier 41 with the aid of the first bearing carrier 30 and the bearings 29 received therefrom, wherein the section 41a of the axle carrier 41 engages in a clearance between the first housing cover 31 and an adjacent section of the housing 32 of the motor-pump unit 28, such that the first bearing carrier 30 partially covers the first portion 41a of the axle carrier 41 on the outside in the assembled state.

On the opposite section 41b of the axle carrier 41, the second bearing carrier 30 partially also covers the second section 41b of the axle carrier 41 outside in the assembled state.

Both bushings 43 and screws 44 extend through central recesses 42 in the bearings 29 to mount the component unit consisting of the motor-pump unit 28, the bearing rod 34, the two bearing carriers 30, and the bearings 29 on the axle carrier 41. The bushings 43 are inserted into the central recesses 42 of the bearings 39, through which the screws 44 extend, wherein external threads of the screws 44 engage in the internal threads of bores in the sections 41a, 41b of the axle carrier 41.

Figure 12:
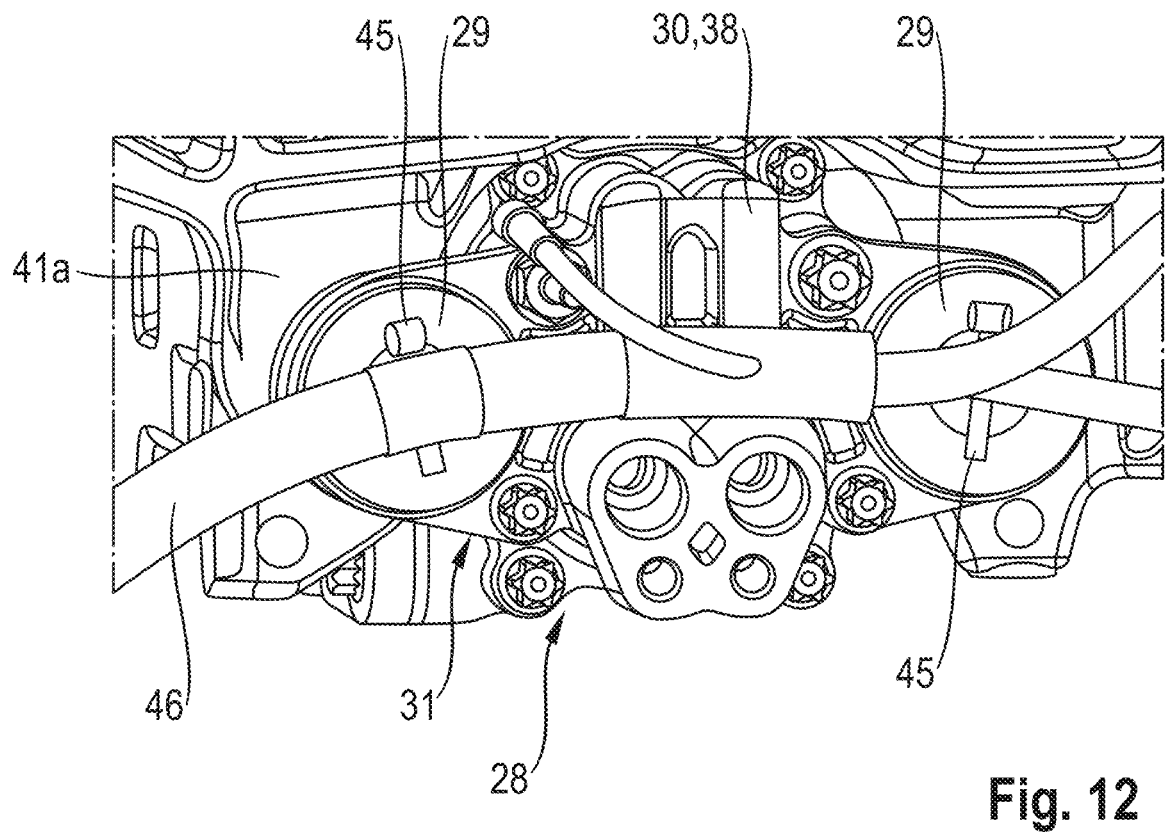
FIG. 12 depicts the excerpt of FIG. 11 together with clips and cables.

FIG. 12 shows clips 45 which are inserted into the bushings 43 and are used to guide and fix cables 46 and/or hoses in an axially rigid and stable manner that saves installation space. For example, electrical cables 46 leading to the control device 27 may be routed and fixed in a defined manner in the area of the axle carrier 41, namely via the clips 45 inserted into the bushings 43 of the bearings 29. The bushings 43 preferably have an internal contour to which the clips 45, namely projections of the clips 45, engaging in the bushings 43 can be connected by claws. This internal contour of the bushings can be configured as internal threads.

Preferably, the tie rod 33 extends together with the bearing tube 34 and/or the motor-pump unit 28 in a construction space for the stabilizer instead of a stabilizer, wherein the two bearing carriers 30 are preferably fastened to connection areas 41a, 41b of the axle carrier 41, which in themselves are present for the fastening of a stabilizer. This allows particularly advantageous integration of the motor-pump unit 28 into a motor vehicle with minimum space requirements.

With the invention, the motor-pump unit 28 of a damping arrangement for the axle of a motor vehicle can be advantageously mounted on the axle carrier 41. This is done with minimum space requirement, wherein the motor pump unit 29 vibrates less when the motor vehicle is traveling. In addition, the connection of the motor-pump unit 29 to the axle carrier 41 is acoustically decoupled so that there is no undesirable noise when the motor vehicle is traveling.

The invention can be used on different motor vehicles via a modification of the length of the bearing tube 34 as well as the tie rod 33. The relative position of the second bearing carrier 30 relative to the bearing tube 34 and the tie rod 33 also allows for flexible use of the invention on different motor vehicles, in particular if the position of the fastening points of the bearings 29 received by the second bearing carrier 30 is different at corresponding sections of the axle carrier from vehicle to vehicle. Accordingly, the damping arrangement according to aspects of the invention can be simply adapted to different types of vehicles, and manufacturing tolerances can also be compensated for.

The invention further relates to a motor vehicle having at least one damping arrangement according to aspects of the invention. Preferably, a damping arrangement according to aspects of the invention is installed in the area of each axle of the motor vehicle, i.e., both in the area of a front axle and in the area of a rear axle of the motor vehicle.

What is claimed is:

1. A damping arrangement of an active chassis for an axle of a motor vehicle, wherein a respective damping system cooperates with each wheel of the axle, wherein each of the damping systems comprises:
   a damper having a double-acting hydraulic cylinder and a piston, wherein the damper is configured to be coupled to a wheel suspension system of the respective wheel,
   a hydraulic pump and an electric motor for driving the respective hydraulic pump, wherein the hydraulic pump is configured to be driven by the electric motor in different directions of rotation to provide different conveying directions, and
   a hydraulic unit having a hydraulic reservoir and valves, wherein the hydraulic pump and the hydraulic unit of the respective damping system cooperate with hydraulic chambers of the hydraulic cylinder of the respective damping system in such a way that the piston moves in either a first actuating direction or a second actuating direction depending upon the conveying direction of the hydraulic pump of the hydraulic unit,
   wherein the hydraulic pumps and the electric motors of both damping systems assigned to the axle are combined to form a motor-pump unit,
   wherein the motor-pump unit is fastened on both sides thereof to an axle carrier of the axle via at least two bearings each, which bearings are received in a common bearing carrier,
   wherein a first bearing carrier is integrated into a first housing cover of a housing of the motor-pump unit, and
   wherein a second bearing carrier is connected to a second housing cover of the housing of the motor-pump unit via a tie rod and a bearing tube.

2. The damping arrangement according to claim 1, wherein each bearing carrier has a goggle-like shape and comprises a monolithic base body with two recesses positioned next to each other for receiving a respective elastic bearing.

3. The damping arrangement according to claim 2, wherein the monolithic base body of the first bearing carrier is integrated into the first housing cover of the housing of the motor-pump unit.

4. The damping arrangement according to claim 3, wherein the base body of the second bearing carrier is connected to the second housing cover of the housing of the motor-pump unit via the bearing tube, wherein the base body of the second bearing carrier and the second housing cover are arranged opposite one another on the bearing tube and are connected to one another via the tie rod under tensile load of the tie rod.

5. The damping arrangement according to claim 1, wherein the tie rod extends within the bearing tube, wherein the bearing tube extends between the second bearing carrier and the second housing cover of the housing of the motor-pump unit and surrounds an exterior of the tie rod.

6. The damping arrangement according to claim 1, wherein each respective bearing has a central recess through which a bushing and a screw extend for fastening the respective bearing to the axle carrier.

7. The damping arrangement according to claim 6, wherein each respective bushing receives a clip for guiding cables and/or hoses on the respective bearing.

8. The damping arrangement according to claim 1, wherein the axle carrier is a chassis or auxiliary frame.

9. The damping arrangement according to claim 1, wherein the tie rod and the bearing tube and/or the motor-pump unit extend in a construction space for a stabilizer, instead of a stabilizer, and are fastened via the respective bearing carrier to connection areas of the axle carrier for the stabilizer.

10. A motor vehicle having multiple axles and a plurality of the damping arrangements of claim 1, wherein a respective damping arrangement of the plurality of the damping arrangements is associated with each axle.

* * * * *